United States Patent [19]

Sefton

[11] 3,819,391
[45] June 25, 1974

[54] ADDITIVE FOR CEMENTITIOUS MIXTURES

[75] Inventor: Robert C. Sefton, Bridgeville, Pa.

[73] Assignee: Koppers Company, Inc., Pittsburgh, Pa.

[22] Filed: Nov. 2, 1970

[21] Appl. No.: 86,187

[52] U.S. Cl.......... 106/273 R, 106/273 N, 106/277, 252/311.5, 260/2.5 B, 260/28.5 AS
[51] Int. Cl............................................ C08h 13/02
[58] Field of Search........... 106/277, 273 R, 273 N; 252/311.5

[56] References Cited
UNITED STATES PATENTS

| | | | |
|---|---|---|---|
| 2,759,839 | 8/1956 | Crews | 106/277 |
| 3,060,047 | 10/1962 | Graff | 106/277 |
| 3,272,765 | 9/1966 | Sefton | 260/28 |
| 3,366,500 | 1/1968 | Kracauer | 106/277 |

Primary Examiner—Allan Lieberman
Assistant Examiner—P. R. Michl
Attorney, Agent, or Firm—Oscar B. Brumback; Olin E. Williams

[57] ABSTRACT

A solid, flake-like composition of matter which consists of a bituminous material distributed throughout a surfactant is disclosed. The composition of matter when charged to water disperses quickly and evenly. This facility of dispersion makes the composition of matter an easy to use additive for cementitious mixtures particularly lightweight cementitious mixtures using expanded polystyrene particles as an aggregrate.

5 Claims, 4 Drawing Figures

INVENTOR.
ROBERT C. SEFTON

INVENTOR.
ROBERT C. SEFTON

ADDITIVE FOR CEMENTITIOUS MIXTURES

BACKGROUND OF THE INVENTION

In the production of lightweight cementitious mixtures, in which expanded polystyrene particles are used as a lightweight aggregate, it is necessary to use an additive to keep the mixture homogeneous. An additive as described in U.S. Pat. No. 3,272,765, consists of two ingredients which are used individually. One ingredient, a surface active agent, helps to disperse the expanded polystyrene particles uniformly throughout the cement and stabilize the resulting dispersion. The other ingredient, a bituminous material, softens the surface of the expanded polystyrene particles, thereby enhancing the bond strength in the resulting cured casting between the expanded polystyrene particles and the cured concrete.

Although the two ingredient additives of U.S. Pat. No. 3,272,765 help to produce excellent lightweight concrete castings there is an inherent disadvantage associated with them. The bituminous ingredient is a viscous organic liquid. Upon charging to an amount of water, which will be subsequently used in the cementitious mixture, the bituminous material quickly coalesces into globules which are difficult to disperse. In this agglomerated form the bituminous ingredient does not function effectively. Rapid mixing is needed to disperse the agglomerated bituminous material, and to make it once again effective.

This invention overcomes the agglomeration problem associated with the prior art by providing an additive for lightweight cementitious mixtures which does not agglomerate upon charging to water.

SUMMARY OF THE INVENTION

A solid flake like composition of matter consisting essentially of 12.5 to 37.5% by weight of a bituminous material distributed throughout 62.5 to 87.5% by weight of a surface active agent. The solid flake is a chemically associated complex which loosely holds the two ingredients together. For example when the composition of matter is charged to water it seems to release an oil which distributes quickly and evenly throughout the water, then after a period of time, the oil settles in the form of tiny droplets at the bottom of the water which droplets do not coalesce into a glob but remain as discrete droplets and upon mild agitation quickly redisperse.

DETAILED DESCRIPTION

The composition of matter of the invention is a brown, solid, flake-like material having a smooth shiny surface. It is brittle and friable, being easily pulverized into a free-flowing powder. The flakes are not oily to the touch, which is surprising, since 12.5 to 37.5% by weight of the composition is a bituminous material. The bituminous nature can be detected however by smelling the composition.

Figure 1:
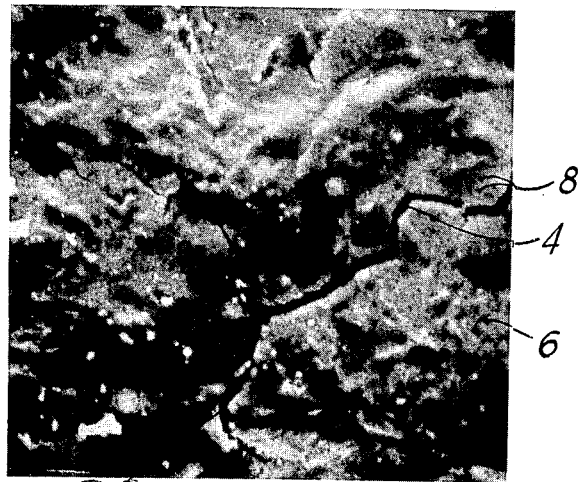
FIG. 1 is a photomicrograph at 300 X depicting the grain structure of the invention.

The ease of dispersion of the novel composition of the invention in water may be due to its physical makeup. Physically the composition has a continuous surfactant phase throughout which is distributed tiny droplets of a bituminous material. This physical makeup can best be seen in FIGS. 1 and 2.

Figure 2:
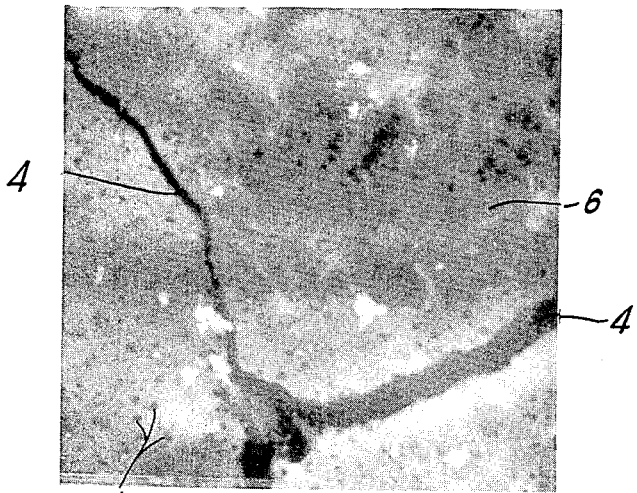
FIG. 2 is a photomicrograph at 1,000 X depicting in greater detail than FIG. 1 the grain structure of the product of the invention.

FIG. 2 is a photomicrograph, taken at 1,000 X of a surface of the composition of matter of the invention. The background area 6 is the surfactant portion of the composition. The small black dots 8, which are dispersed randomly and evenly throughout the background area 6, are the bituminous material. The cracks 4 are due to vaporizing residual water which is present in the product after the making. This residual water vaporized because the photomicrograph was taken with an electron microscope which operates under high vacuum. The photomicrograph of course, only shows the physical makeup of the composition and does not show any chemical interaction between the surfactant and the bituminous material. From chemical investigative techniques the novel composition may not be a chemical compound in the classical sense, but it appears to be a complex compound of a heretofore unknown type in which the bituminous material and surfactant are held together by weak physical and/or quasi-chemical forces. The complex is so fragile that it is destroyed by the traditional analytical investigations such as steam distillation, solvent extraction, and thermal analysis.

Figure 3:
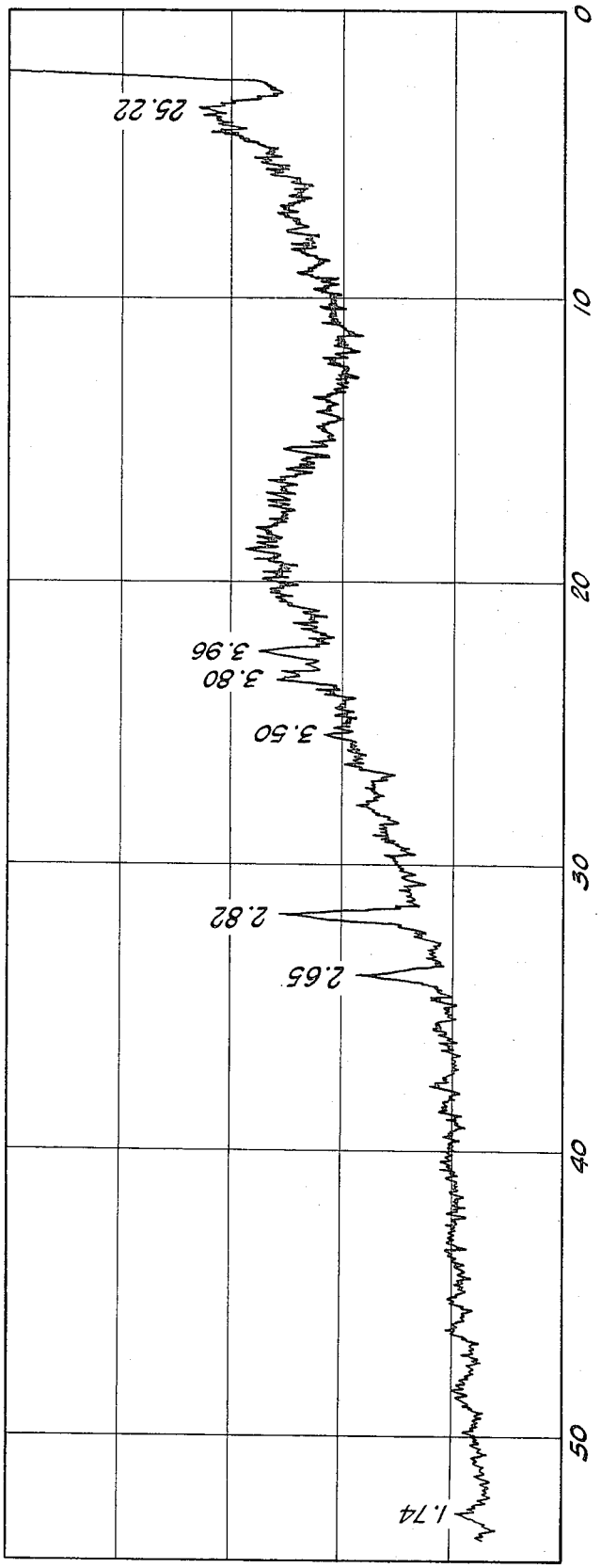
FIG. 3 is a reproduction of the chart read out recording the diffraction of x-rays by the product of the invention.
Figure 4:
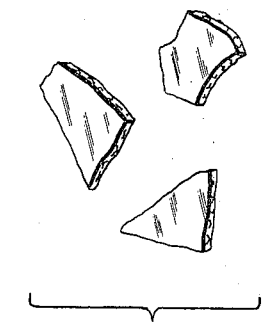
FIG. 4 is a drawing showing the flake-like composition of matter of the invention.

Although the fragile nature of the complex does not permit the composition of matter of the invention to be defined precisely as a classical chemical compound, nevertheless based on evidence gathered by modern analytical investigation, the composition is more than a simple admixture of the individual ingredients. Evidence gathered by x-ray diffraction studies indicate the composition of matter of the invention is a chemically associated complex. As an illustration, x-ray diffraction studies were taken of a powder specimen of the composition of matter of the invention. The instrument used for generating the x-rays and for measuring the angle of diffraction of the x-rays was a Norelco x-ray diffractometer, using a copper $K_\alpha$ radiation source with a nickel filter. Detection of diffracted x-rays were done successively by a geiger counter on a rotating arm. FIG. 3 is a record of the x-ray diffraction pattern of the product of the invention. The record gives a set of values of $2\theta$ which has been converted by the Bragg equation to a set of plane spacings (so called $d$ spacings) given in angstrom units (A). The $d$ spacings are characteristic of the crystallinity. FIG. 3 shows a peak at 25.22 A which is an amorphous halo. This amorphous halo occurs for all materials which have amophous characteristics. In the novel compositions at 3.96A, 3.50 A, 3.80 A, 2.82 A, 2.65 A, and 1.74 A, there are peaks evidencing crystalline structure. In contrast, the diffraction patterns of the surfactant portion which is a mixture of sodium salts of polymeric carboxylic acids (TAMOL 731 dry basis) and sodium salts of formaldehyde condensed naphthalene sulfonic acids (TAMOL SN), evidenced no crystallinity. Also the diffraction patterns of the individual surfactant components taken alone evidenced no crystallinity. The bituminous component, TRANSPHALT L-3, being a liquid has no crystallinity.

Therefore, by comparing the x-ray diffraction patterns of the composition of matter of the invention and the x-ray diffraction patterns of the individual ingredients of the composition, it appears that there is crystallinity in the composition of matter of the invention, which crystallinity is not attributable to any of the individual components that entered into the composition of matter of the invention. The crystallinity is due to an unexpected interaction of the individual components in which interaction the molecules have associated themselves in a definite and precise fashion to form a chemically associated complex.

By ultimate analysis, the composition of matter of the invention comprises about 12.5 to 37.5% by weight of the bituminous material and the remainder essentially 62.5 to 87.5% by weight of the surfactant. If less than the minimum amount of bituminous material be present in the novel composition, that is less than 12.5% by weight, the resulting composition of matter will be inefficient for expanded polystyrene cementitious mixtures. It is postulated that this inefficiency is because the additive will not have enough bituminous material to soften the surface of the polystyrene beads and as a consequence the resultant cured casting will have a poor bead to concrete bond. On the other hand if too much bituminous material be present in the novel composition, i.e., greater than 37.5% by weight, the resultant composition of matter, when used as an additive in lightweight polystyrene cementitious mixtures, gives a resultant concrete casting which has shriveled polystyrene beads throughout the casting.

Because the composition is a chemically associated complex, care must be exercised in the production of this complex. Generally, the process for making the composition of matter of the invention involves the steps of mixing together in about 20 to 40% by weight of an aqueous medium 50 to 70% by weight of a surface active agent and 10 to 30% by weight bituminous material, agitating the mixture to disperse the bituminous material throughout the aqueous phase and then drying the mixture to form the novel composition of matter.

As stated above, while the quantities of the individual ingredients used may be within the range specified above, care should be taken that the range is not exceeded. If greater than the specified range of bituminous material is used, that is greater than 30% by weight, the bituminous material will not disperse evenly, but will agglomerate. If less than the specified amount of bituminous material is used, that is less than 10% by weight, a resultant composition will be formed on drying which will not be suitable as an additive to cementitious mixtures. The quantity of surfactant is also important. There must be sufficient surfactant present to form a stable dispersion. If insufficient surfactant be present, that is less than 50% by weight, the bituminous material will separate. If greater than the specified amount of surfactant be present, that is greater than 70% by weight, the resultant mixture gels and this gel does not behave as the novel composition of this invention does. When the chemically associated complex is being formed, the quantity of aqueous medium in which the complex is formed becomes important. If there be greater than 40% by weight of water in the total reaction mass, the bituminous material tends to separate. If there be insufficient aqueous medium, that is less than 20% by weight of the reaction mass, the bituminous material will not disperse, but a thick unworkable grease will form.

A wide variety of surface-active agents, anionic, cationic, and non-ionic surface-active agents, are useful in the practice of the invention. Particularly useful additives can be classified according to their chemical structure as follows:

1. Anionic agents which include alkyl aryl sulfonates, such as alkyl naphthalene sulfonates, commercially available under the trademarks ALKANOL B, ALKANOL X, NEKAL BX–78; sodium salts of formaldehyde condensed naphthalene sulfonic acids commercially available under the trademarks DARVAN NO. 1, DARVAN NO. 2 and TAMOL SN; alkyl sulfonates such as sodium lauryl sulfonate, commercially available under the trademark DUPANOL NA; lignosulfonates prepared by the sulfonation of lignin, such as calcium lignosulfonate, commercially available under the trademark MARASPERSE C, and sodium lignosulfonates commercially available under the trademark POLYFON F, and saponified resins such as saponified resin extract from southern pine wood commercially available under the trademark VINSOL NVX; sodium salts of polymeric carboxylic acids commercially available under the tradename of TAMOL 731. (25% aqueous solution). 2. Cationic agents which include quaternary ammonium salts such as lauryl pyridinium chloride, and trimethyl octadecyl ammonium bromide; and secondary amines such as N-(1-methylheptyl) ethanol amine and N,N'-bis(1-methylheptyl) ethylene diamine, commercially available under the trademark ALKAMS.

3. Non-ionic agents which include products of methylene oxide condensed with fatty acids, alcohols, or phenols such as alkylated aryl polyester alcohols commercially available under the trademarks TRITON X–45, TRITON X–100. Particularly good non-ionic agents, which preferably are used in mixtures are TWEEN 80, which is a polyoxyethylene sorbitan monooleate, and SPAN 80 which is a sorbitan monooleate. It should be appreciated that mixtures of the various surfactants may also be used. A particularly suitable surfactant mixture is the mixture of surfactants sold commercially under the trademarks TAMOL SN and TAMOL 731 (25% by weight aqueous solution).

The bituminous material usable in accordance with this invention may be any of the low viscosity, low softening point materials selected from asphalt, coal tar, or derivatives therefrom. The bituminous material, since it must be predispersed in water, should be a liquid at the temperature at which the chemical associated complex is being formed. Therefore, the less viscous asphalts are contemplated in the practice of this invention.

Asphalts having a Saybolt viscosity of 10 to 4,000 SFS at 50° C are contemplated by this invention. Alternately, solvent cut asphalts may be used. Solvent cut asphalts are formed by diluting (cutting back) a solid or semisolid asphaltic material with a petroleum distillate fraction.

The tars are brown to black viscous liquids produced from the destructive distillation of such organic materials such as coal, petroleum and wood. Particularly suitable are tars derived from the destructive distillation of coal. The tars should also be a liquid at the temperature at which the homogenizing agent mixture is made. The viscosity of the tars should be within the range of 10 to 4,000 SFS at 50° C. The higher viscosity tars can be cutback with solvent to achieve the desired viscosity.

Besides the tars, distillates of the tars may be used. Tar distillates such as creosote oil which distills at about 200°–400°C and contain substantial amounts of naphthalene, anthracene and phenanthrene is also suitable in the practice of the invention.

Particularly suitable bituminous materials are those sold commercially under the trademark TRANSPHALT. These particular bituminous materials are dark thermoplastic resins of polymeric polynuclear hydrocarbons made by cracking petroleum under controlled conditions to yield unsaturated aromatics and then polymerizing these aromatics to a product having a low melting point. TRANSPHALT L-3 for example has a melting point of 3°C. The bituminous materials sold under the trademark TRANSPHALT have relatively low molecular weight and a high carbon to hydrogen ratio; they contain less than .18 % free carbon, and substantial amounts of polymerized unsaturants similar to those found in coal tar fractions boiling between 150°–300°C; they are soluble in aromatic, chlorinated, and terpene solvents, but only partially soluble in aliphatic hydrocarbons; they are liquid at room temperature and have a Saybolt viscosity at 50°C of about 200 – 1,000 SFS.

The composition of matter of the invention has utility in cementitious mixtures, particularly lightweight cementitious mixtures using expanded polystyrene particles as an aggregate. When used as an additive in cementitious mixtures, the composition of matter of the invention, enhances the water resistance of the resultant cured concrete castings. When used as an additive in lightweight cementitious mixtures, using expanded polystyrene particles as an aggregate, the composition of matter of the invention also acts as a homogenizing agent helping to disperse the lightweight expanded polystyrene particles uniformly throughout the mixture and to maintain the dispersion uniform. Additionally the composition of matter of the invention when used in expanded polystyrene particles—cement mixtures, softens the surface of the expanded polystyrene beads, so as to enhance the bonding of the beads to the surrounding cured concrete.

The amount of the composition of matter of the invention which is added to the cementitious mixture should be between 0.1 to 2% by weight based on cement weight. Too much additive, that is greater than 2% by weight based on cement weight results in a frothy mix, a mix having an excessive slump or in a resultant cured casting having a powdery surface. Too little additive, that is less than 0.1% by weight based on cement weight is not sufficient to enhance the properties of the cementitious mixtures or the resultant cured concrete castings in accordance with the invention.

EXAMPLE I

Into a 10-quart Hobart mixer, with a wire wip agitator, were charged sequentially 450 grams of a 25% aqueous solution of sodium salts of polymeric carboxylic acids (TAMOL 731), 450 grams of a bituminous material (TRANSPHALT L-3), and 675 grams of a sodium salt of formaldehyde condensed naphthalene sulfonic acids (TAMOL SN). Agitation was continued for 10 minutes at 258 rpm until the TRANSPHALT L-3 bitumin was evenly dispersed throughout the aqueous medium. With continued agitation, 450 grams of water and an additional 675 grams of the surfactant, TAMOL SN, were added to the mixture and agitation was continued for 10 minutes. Agitation was then stopped and the mixture was transferred to a rotary flash evaporator. The evaporator was heated to 50°C and was subjected to 15 mm of Hg of vacuum. After about one-half hour under these conditions the water had evaporated and a dark brown flake-like material remained which was the composition of matter of the invention.

EXAMPLE II

The product of the invention as made in accordance with Example I is an excellent component for waterproofing cement. Cementitious mixtures were prepared by mixing 100 grams of Portland cement with 40 grams of water, and various amounts of the composition of matter of the invention (aliquots of the product of Example I) as shown in Table I below in a 5 oz. paper cup with a metal spatula. The various cementitious mixtures were mixed until the cement had become uniformly wetted and the mixture had attained a homogeneous consistency.

The cementitious mixtures were then poured into a 2 inch diameter by ½ inch deep aluminum cup. The cup was covered with polyethylene film and the cement was permitted to cure for 7 days at room temperature. The polyethylene was then stripped away and the cured castings were exposed to the air for 7 more days at room temperature. The cured castings were then removed from the aluminum dishes and weighed. The cured cement castings were then completely submerged in the water for 24 hours, after which time they were removed from the water, towel dried, and weighed. The gain in weight of the castings over the dry weighed samples reported as the water pick-up and is shown in Table I below.

TABLE I

WATER PICK-UP OF CONCRETE SAMPLES MADE WITH VARYING AMOUNTS OF THE PRODUCT OF THE INVENTION

| Sample | % by wt. product in sample | Dry wt. of sample in grams | Wt. after 24 hrs. soak in grams | Water pick-up in grams |
|---|---|---|---|---|
| A | 0% | 92.8 | 101.2 | 8.4 |
| B | ½% | 92.6 | 99.9 | 7.3 |
| C | 1% | 92.4 | 98.7 | 6.3 |
| D | 1½% | 92.4 | 98.2 | 5.8 |
| E | 2% | 92.4 | 98.5 | 5.9 |
| F | 2½% | 89.6 | 98.1 | 8.5 |

¹Based on Cement weight.

From Table I it can be seen that the addition of the small amount of one-half to 2% by weight of the novel composition of the invention improves the water resistance of the resultant cured castings over a controlled sample prepared without using the novel composition of this invention. Also, it appears that a threshold value of about 2% by weight of the additives is reached and that additions of greater than this amount decrease the water resistance of the resultant cured concrete casting.

EXAMPLE III

The composition of the invention maintains the mixture of lightweight concrete homogeneous and provides a lightweight concrete casting with excellent physical properties. To a 22 quart Reyanolds mixer operating at 85 rpm is charged 1 lb. 2 oz. of water and 12 grams of the composition of Example I. The composition disperses quite evenly with mixing, giving the water the characteristic brown tinge of the bituminous material. The mixing speed was adjusted to 85 rpm and 2 quarts of expanded polystyrene beads having a bulk density of 2½ pounds per cubic foot were added. The mixing was continued for 2 minutes until the original white expanded beads became uniformly discolored. Immediately, 2 lbs. 12 oz. of Portland Cement, Type I were added to the mixture and the mixing continued for 3 minutes until the expanded polystyrene beads had become uniformly distributed throughout the cement phase. 200 Grams of cement-polystyrene mixture was then poured with agitation onto a standard flow table as specified by ASTM C-230-68. The polystyrene-cement composition had a flow of 8½ inches as measured by ASTM 255. This flow value indicated that the expanded polystyrene particles were uniformly distributed throughout the cement and that the cementitious mixture had the correct amount of water. Also, the wet density of the composition was measured and found to be 41 pounds per cubic foot. 200 Grams of the polystyrene cement composition were poured with agitation into 1½ inch × 1½ inch × 6¼ inch brass molds. The filled molds were covered with polyethylene film and permitted to cure at room temperature for 7 days. The film was removed and the castings were exposed to the air for 7 more days after which time they were removed from the molds. Upon visual examination the expanded polystyrene particles were uniformly distributed throughout the surrounding concrete. Also the beads were firmly bonded to the concrete. The dry density of the castings was 38.40 pounds per cubic foot. The cured castings were tested for flexural modulus of rupture and compressive strength according to ASTM C-348 -68T, the flexural modulus of rupture was 334 pounds per square inch and the compressive strength was 630 pounds per square inch. The specimens had the expected improved water resistance.

Thus the invention provides an excellent additive for cementitious mixtures, particularly lightweight cementitious mixtures, employing expanded polystyrene particles as an aggregate. The composition of the invention is storage stable and disperses evenly and quickly when added to water. This ease of dispersion in water is surprising when it is considered that up to 37.5% of the composition is a bituminous component.

What is claimed is:

1. A flake-like solid composition
   a. that is easily dispersable in water and
   b. that is a chemically associated complex having the appearance of bituminous material distributed throughout a surfactant material, and
   c. whose initial ingredients for the formation of the complex comprise by weight a bituminous material in the minor amount of 12.5 to 37.5 percent and a surfactant in the major amount, by difference, of 62.5 to 87.5 percent.

2. The composition of matter according to claim 1 in which the surfactant is a mixture of sodium salts of formaldehyde condensed naphthalene sulfonic acids and sodium salts of polymeric carboxylic acids.

3. The composition of matter according to claim 1 in which the bituminous material is a thermoplastic resin of polymeric polynuclear hydrocarbons made by cracking petroleum under controlled conditions to yield unsaturated aromatics and then polymerizing these aromatics to a product having a melting point of about 3°C.

4. A solid flake-like composition of matter consisting essentially of 12.5 to 37.5% by weight of a bituminous material which comprises a thermoplastic resin of polymeric polynuclear hydrocarbons made by cracking petroleum under controlled conditions to yield unsaturated aromatics and then polymerizing these aromatics to a product having a melting point of about 3°C, said bituminous material dispersed randomly and evenly throughout 62.5 to 87.5% by weight of surfactant which comprises a mixture of sodium salts of formaldehyde condensed naphthalene sulfonic acids and sodium salts of polymeric carboxylic acids, and forming therewith a chemically associated complex.

5. A process by which a bituminous material can be distributed in a surface-active agent to form a solid, free-flowing flake, consisting essentially of the following steps:
   a. mixing together in 20 to 40% by weight of an aqueous medium,
      i. 50 to 70% by weight of the surface-active agent; and
      ii. 10 to 30% by weight of the bituminous material;
   b. agitating the mixture to form a dispersion; and
   c. drying the dispersion to form the solid, free-flowing flake whereby the flake upon addition to water releases an oil which distributes quickly and evenly throughout the water.

* * * * *